United States Patent
Joshi et al.

(10) Patent No.: US 12,459,654 B2
(45) Date of Patent: Nov. 4, 2025

(54) SMART HEATER FOR AIRCRAFT GENERATOR FREEZE PROTECTION

(71) Applicant: Hamilton Sundstrand Corporation, Charlotte, NC (US)

(72) Inventors: Ashutosh Joshi, Roscoe, IL (US); Chukwunyere Ofoegbu, Elgin, IL (US); Debabrata Pal, Hoffman Estates, IL (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 939 days.

(21) Appl. No.: 17/669,427

(22) Filed: Feb. 11, 2022

(65) Prior Publication Data

US 2023/0257125 A1    Aug. 17, 2023

(51) Int. Cl.
*B64D 15/12*    (2006.01)
*B64D 41/00*    (2006.01)
*H02K 15/125*    (2025.01)
*H05B 3/14*    (2006.01)

(52) U.S. Cl.
CPC ............ *B64D 15/12* (2013.01); *B64D 41/007* (2013.01); *H02K 15/125* (2013.01); *H05B 3/145* (2013.01); *H05B 2214/02* (2013.01)

(58) Field of Classification Search
CPC .... B64D 41/007; B64D 15/12; H02K 15/125; H05B 3/145; H05B 2214/02
See application file for complete search history.

(56) References Cited

U.S. PATENT DOCUMENTS

| | | | |
|---|---|---|---|
| 6,593,547 B1 | 7/2003 | Raad | |
| 9,296,487 B2 | 3/2016 | Larson, Jr. | |
| 2002/0154999 A1 | 10/2002 | Eccles et al. | |
| 2010/0096507 A1* | 4/2010 | Villinger | B64D 15/12 219/202 |
| 2011/0236218 A1 | 9/2011 | Russ et al. | |
| 2019/0284997 A1* | 9/2019 | Fakult | F02C 7/047 |
| 2020/0361612 A1 | 11/2020 | Bonaccurso et al. | |

FOREIGN PATENT DOCUMENTS

CN    102198860 A    9/2011

OTHER PUBLICATIONS

Abstract for CN102198860, Published: Sep. 28, 2011, 1 page.
European Search Report for Application No. 23155908.9, mailed Apr. 25, 2023, 13 pages.

* cited by examiner

*Primary Examiner* — Nathaniel E Wiehe
*Assistant Examiner* — Theodore C Ribadeneyra
(74) *Attorney, Agent, or Firm* — CANTOR COLBURN LLP

(57) ABSTRACT

A ram air turbine assembly includes one or more airfoils and a ram turbine operably connected to the one or more airfoils. The ram air turbine includes: a rotor; a stator that includes windings; and a self-regulating heater coupled to the stator. The self-regulating heater configured to vary power that passes through it based on a temperature of the heater.

10 Claims, 5 Drawing Sheets

SMART HEATER FOR AIRCRAFT GENERATOR FREEZE PROTECTION

BACKGROUND

The present disclosure generally relates to heating schemes for aircraft devices, and more specifically, heating schemes for ram air turbines (RATs) that employs smart heaters.

Some aircraft are provided with a backup power source that may be RAM air driven. The backup power source is sometimes referred to as a ram air turbine (RAT) and is movable between a stowed position within the aircraft fuselage when the RAT is inactive and a deployed position in which the ram air turbine is activated and outside of the aircraft fuselage.

In general, the RAT is used to extract power from an airstream for emergency or other use. A RAT typically includes a rotating turbine mounted to a strut, a driveshaft/driveline potentially including a gearbox, a power generation device that is typically an electrical generator, a hydraulic pump or both and ancillary equipment such as a stow abort mechanism, bonding straps, a turbine release cable, a proximity sensor, etc. Certain types of RATs may be mounted to in-flight refueling or weapons pods for military use under extreme temperatures (i.e., well below freezing).

A heater can be provided in the RAT generator to heat the air gaps between stator and rotor in the generator to keep them above freezing temperature under different operating conditions. Most of the heaters used are fixed power and are generally ON during flight. This can lead to situations where the heater is operated even when not needed and result in wasted power.

BRIEF DESCRIPTION

According to some embodiments a ram air turbine assembly is disclosed. The assembly includes one or more airfoils; and a ram turbine operably connected to the one or more airfoils. The ram air turbine includes: a rotor; a stator that includes windings; and a self-regulating heater coupled to the stator. The self-regulating heater is configured to vary power that passes through it based on a temperature of the heater.

In addition to one or more of the features described above, or as an alternative, further embodiments of the system may include having the heater include: first and second electrodes; and a silicone matrix that includes conductive particles therein.

In addition to one or more of the features described above, or as an alternative, in further embodiments of the system the conductive particles are conductive carbon particles.

In addition to one or more of the features described above, or as an alternative, in further embodiments of the system the electrodes are copper.

In addition to one or more of the features described above, or as an alternative, in further embodiments of the system further include a power source electrically coupled to the first and second electrodes.

In addition to one or more of the features described above, or as an alternative, in further embodiments of the system further include a current limiting element disposed between the power source and the heater that adjusts an offset of the heater to control a threshold.

In addition to one or more of the features described above, or as an alternative, in further embodiments of the system the first and second electrodes include projections, wherein projections of the first electrode extend toward the second electrode and do not touch the extensions of the second electrode.

In addition to one or more of the features described above, or as an alternative, in further embodiments of the system the heater includes upper and lower outer layers that surround at least portions of the first and second electrodes and the silicon matrix.

In addition to one or more of the features described above, or as an alternative, in further embodiments of the system the upper and lower outer layers include polyimide.

In addition to one or more of the features described above, or as an alternative, in further embodiments of the system heater is disposed on an end of the stator.

In addition to one or more of the features described above, or as an alternative, in further embodiments of the system the turbine includes a housing and the heater is disposed in a gap formed between the housing and the stator.

Also disclosed is a self-regulating heater for use on a ram air turbine assembly. The heater includes: first and second electrodes; and a silicone matrix that includes conductive particles therein. The self-regulating heater is configured to vary power that passes through it based on a temperature of the heater.

In addition to one or more of the features described above, or as an alternative, in further embodiments of the heater the conductive particles are conductive carbon particles.

In addition to one or more of the features described above, or as an alternative, in further embodiments of the heater the electrodes are copper.

In addition to one or more of the features described above, or as an alternative, in further embodiments of the heater the heater includes a power source electrically coupled to the first and second electrodes.

In addition to one or more of the features described above, or as an alternative, in further embodiments of the heater the heater includes a current limiting element disposed between the power source and the heater that adjusts an offset of the heater to control a threshold.

In addition to one or more of the features described above, or as an alternative, in further embodiments of the heater the first and second electrodes include projections, wherein projections of the first electrode extend toward the second electrode and do not touch the extensions of the second electrode.

In addition to one or more of the features described above, or as an alternative, in further embodiments of the heater the heater includes upper and lower outer layers that surround at least portions of the first and second electrodes and the silicon matrix.

In addition to one or more of the features described above, or as an alternative, in further embodiments of the heater the upper and lower outer layers include polyimide.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The subject matter which is regarded as the invention is particularly pointed out and distinctly claimed in the claims at the conclusion of the specification. The foregoing and other features and advantages of the invention are apparent from the following detailed description taken in conjunction with the accompanying drawings in which:

DETAILED DESCRIPTION

A detailed description of one or more embodiments of the disclosed apparatus and method are presented herein by way of exemplification and not limitation with reference to the Figures.

Figure 1:
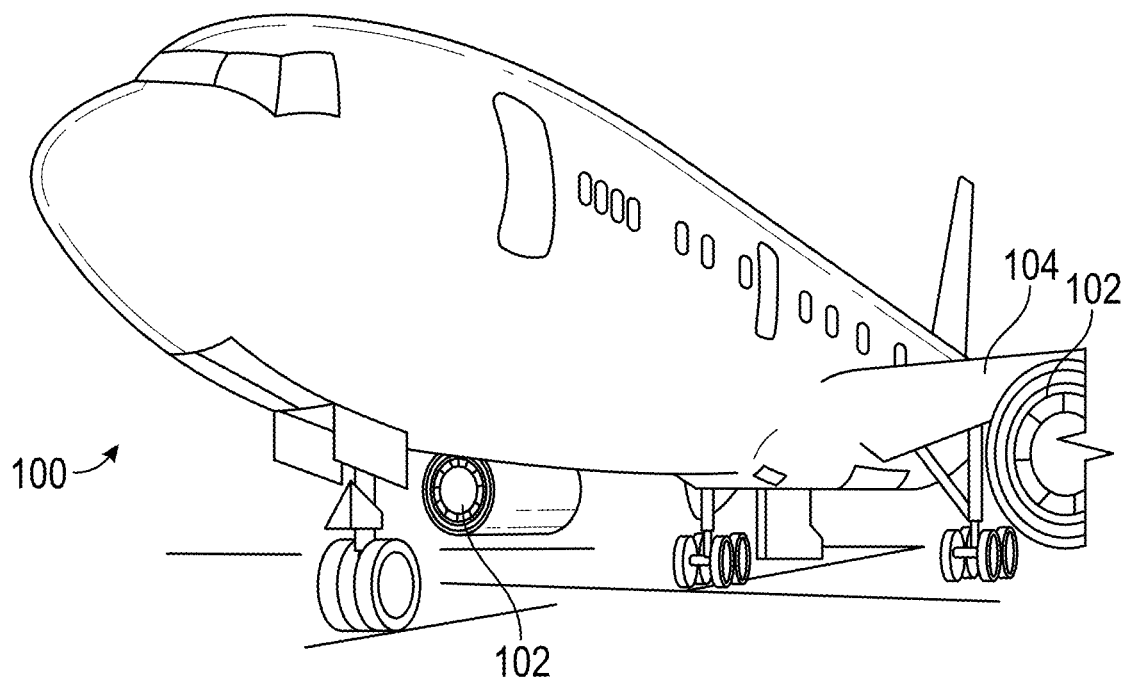
FIG. 1 is a simplified view of aircraft on which a ram air turbine (RAT) assembly can be carried.

As shown in FIG. 1, an aircraft 100 typically includes one or more engines 102 for driving flight and powering the aircraft. The engines 102 are typically mounted on wings 104 of the aircraft 100 but may be located at other locations depending on the specific aircraft configuration. In some aircraft, the engine(s) may be tail mounted, or housed within the body of the aircraft, or otherwise arranged as will be appreciated by those of skill in the art.

Each engine 102 of the aircraft 100, regardless of location, may include one or more attached or connected generators, as appreciated by those of skill in the art. The generators may provide electrical power to various components of aircraft, as will be appreciated by those of skill in the art. In some configurations, the generators may be operably connected to an output shaft of the engine which drives a stator/rotor to generate electricity. In other configurations, a shaft from the engine may interface to a gearbox, and generators may be mounted, as an accessory, to the gearbox.

In addition to the power generated by the traditional or main engines (i.e., engines 102), additional power generation systems may be arranged on an aircraft. One type of such alternative, backup, or supplemental power generation may be a ram air turbine. The ram air turbine may be located in a nose portion of the aircraft, or at some other location, as will be appreciated by those of skill in the art (e.g., wing, wing-to-body fairing, etc.).

Figure 2:
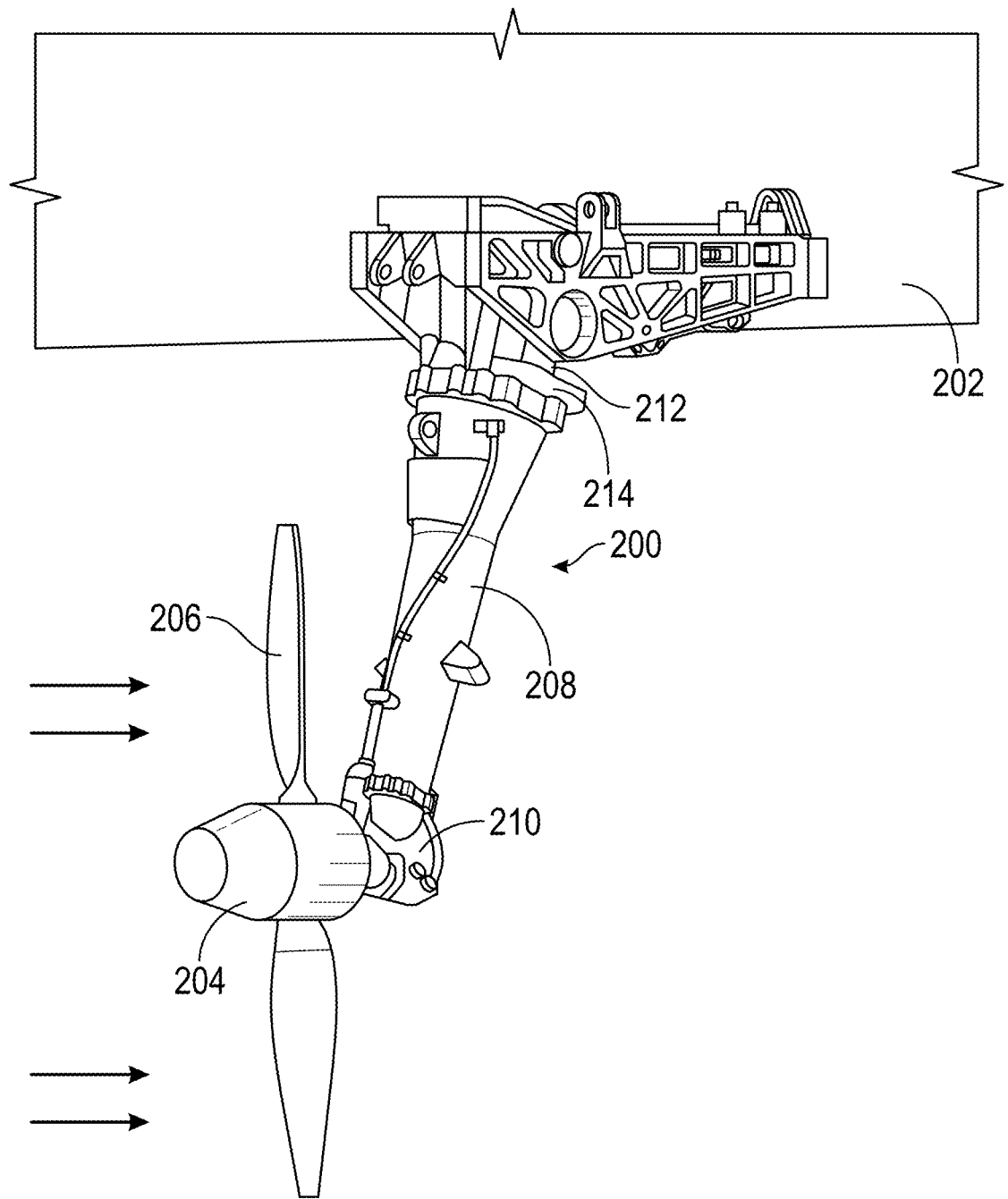
FIG. 2 is a side view of a RAT assembly and system in accordance with embodiments shown in the deployed position.

Referring to FIG. 2, a ram air turbine (RAT) assembly 200 is illustrative shown. The ram air turbine assembly 200 is movable between a stowed position within an aircraft 202 (e.g., a nose or other part of the fuselage) and a deployed position. The deployed position is illustratively shown in FIG. 2.

The ram air turbine assembly 200 includes a turbine 204 with airfoils 206 (e.g., blades) that rotate responsive to airflow. The turbine 204 is suspended on a strut 208 that moves between the deployed and stowed positions. The strut 208 supports a gearbox 210 that transmits power from the turbine 204 to a generator 212 within a generator housing 214. The strut 208 is attached to the generator housing 214 within which the generator 212 is supported. The example, illustrative ram air turbine assembly 200 shown in FIG. 2 includes the generator 212. However, ram air turbine assemblies of the present disclosure could also be utilized to drive a hydraulic pump or other power generator or conversion device, as will be appreciated by those of skill in the art.

The ram air turbine may further comprise, for example, an electrical power conversion device. The electrical power conversion device is configured to convert rotation from the turbine into electrical energy (e.g., with a generator). Further, in some embodiments, a combination of both hydraulic and electric power generation/conversion can be implemented, without departing from the scope of the present disclosure.

The gearbox (e.g., gearbox 210) of the ram air turbine assembly (e.g., ram air turbine assembly 200) is configured to receive and transmit rotation from a turbine shaft to a drive shaft. For example, the gearbox may be configured to receive the turbine shaft which rotates at a turbine rotational velocity and convert the rotation to a different speed drive shaft rotational velocity (e.g., higher or lower than the turbine rotational velocity). The drive shaft may be operably connected to the hydraulic/electrical conversion devices and drive operation thereof. Operable connections between the turbine and a power converter (or generator) may be a direct connection, a gearbox (as shown), or some other connection. For example, in a typical arrangement, a gear set may be provided within a gearbox to provide increased or decreased rotational speeds, depending on the specific application.

In one embodiment, the turbine 204 is configured to have an operating range of approximately 3,800-5,000 RPM (or 63.33-83.33 Hz), with suitable gearing providing a gear ratio to operate the strut driveshaft 20 and the generator 16 at an operating range of approximately 8,000-12,000 RPM (133-200 Hz).

In service, the ram air turbine 204 may be subject to a wide ambient temperature range that may reach temperatures as low as negative sixty-five degrees Fahrenheit. Such low ambient temperatures may cause a severe increase in viscosity of lubricants used for the parts of components in the power train that have lubrication surfaces, such as the gear box, drive line bearings, and generator bearings. Upon deployment, the ram air turbine 204 shifts from the stowed position to the deployed position as shown in FIG. 2. In the deployed position, an air stream (see arrows) causes a rotational force on turbine 204 due to rotation of the blades 206. If the air gap between stator and rotor is frozen then it may not be able to rotate and function as intended.

However, when deployed the cold air can affect the lubricants or other operating parameters of the turbine 204. To counteract the negative effects due to temperature change a heater is commonly implemented in design to keep the air gap above freezing point of water. However, such heaters are always "on" and, thus, are inefficient. In some cases a traditional flex Kapton based heater is used around the main generator core between housing and core. The heater is adhered to the core to maintain the air gap between stator and rotor air gap above freezing point under worst case operation condition (i.e. ambient of −40 C). In addition to the above power related issues, if the heater if not sized properly it could burn locally due to higher heat flux. In addition, heaters are often sized so generator will not overheat during a hot day low altitude or ground condition. Also if the heater is not glued properly it could become locally dislodge due to air gap between heater tape and adhered surface.

Herein disclosed is a self-regulating or "smart" heater that provides heat to the RAT 204 based on the temperature of the RAT and its surrounding environment. In particular, in one embodiment, a heater if provided that includes input/output conductor physically separated from one another. The conductors can be placed on a matrix. The matrix can be a silicone matrix loaded with conductive carbon particles in one embodiment. As more fully explained below, the matrix will increase in resistance with temperature and, thereby, reduce heating as temperature increases with a DC voltage applied across the heater.

The heater can be adhered to generator around the main generator core between the housing and the core or on core ends to provide good contact. Alternately the heater is used closest to the main generator air gap to be more efficient. As more fully described below, the heater generates maximum amount of heat when its surrounding environment (e.g., air/generator) is cold. This is due to the carbon particles being close to each other and providing less resistance and thus, greater current passes through the conductors carbon and generates heat. As the heater "heats up" the carbon particles disperse and the heater becomes more resistive. This will decrease current though the heater and reduce heat produced. At certain temperature heater power is cut-off due to particles separated far apart from each other to increase resistance significantly. The skilled artisan will understand based on the above that the heater switches effectively off at higher ambient temperatures and functions as a self-regulating heater without the need of a thermostat and thereby provides safety and simplicity.

Figure 3:
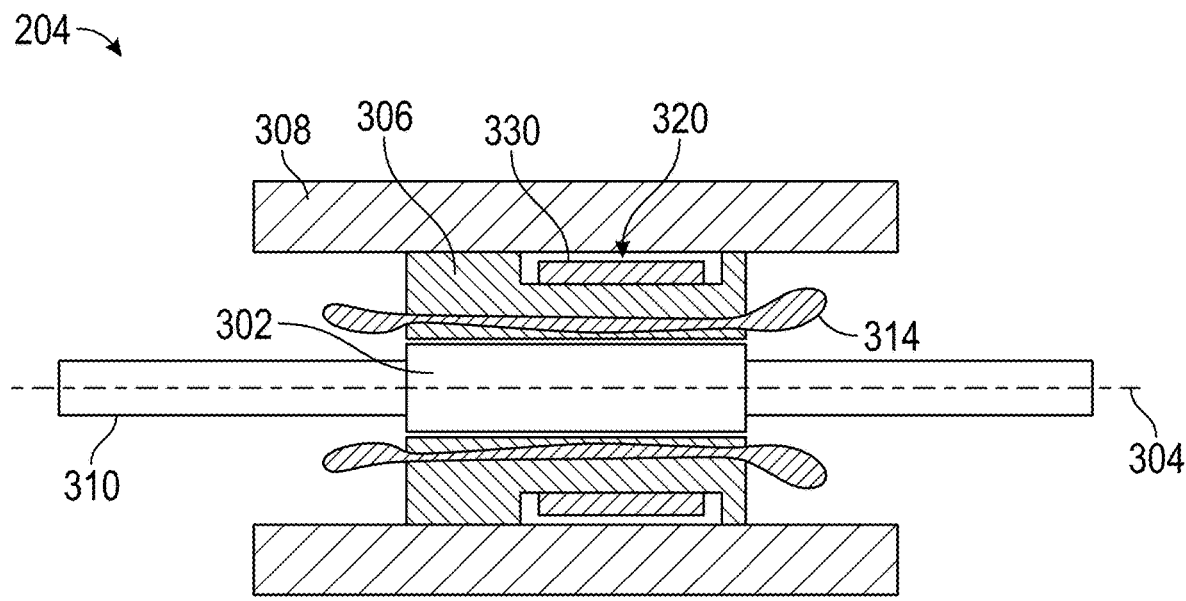
FIG. 3 shows a simplified generator on which the heater disclosed herein is located between stator and the housing.

With reference now FIG. 3, a simplified example ram air turbine (RAT) 204 is illustrated. The RAT 204 includes rotor 302 configured to rotate about a rotation axis 304. A stator 306 is located radially outboard of the rotor 302 relative to the rotation axis 304, with a radial air gap located between the rotor 302 and the stator 306. As illustrated, the rotor 302 may be mounted on a shaft 310 which may impart rotational movement to the rotor 302. The rotor 302 and the shaft 310 may be fixed together such that the rotor 302 and the shaft 310 rotate about the rotation axis 304 together as one piece. The rotor 302 and the stator 306 are surrounded by a housing 308.

The stator 306 includes forms a stator core in which a plurality of electrically conductive stator windings 314 are disposed. In some embodiments, the stator is formed from a plurality of axially stacked laminations, which are stacked along the rotation axis 304. In some embodiments, the laminations are formed from a steel material, but one skilled in the art will readily appreciate that other materials may be utilized. Interaction between the rotor 302 and the stator windings 314 results in the creation of electrical current in the windings that can be used, for example, by the aircraft.

Figure 4:
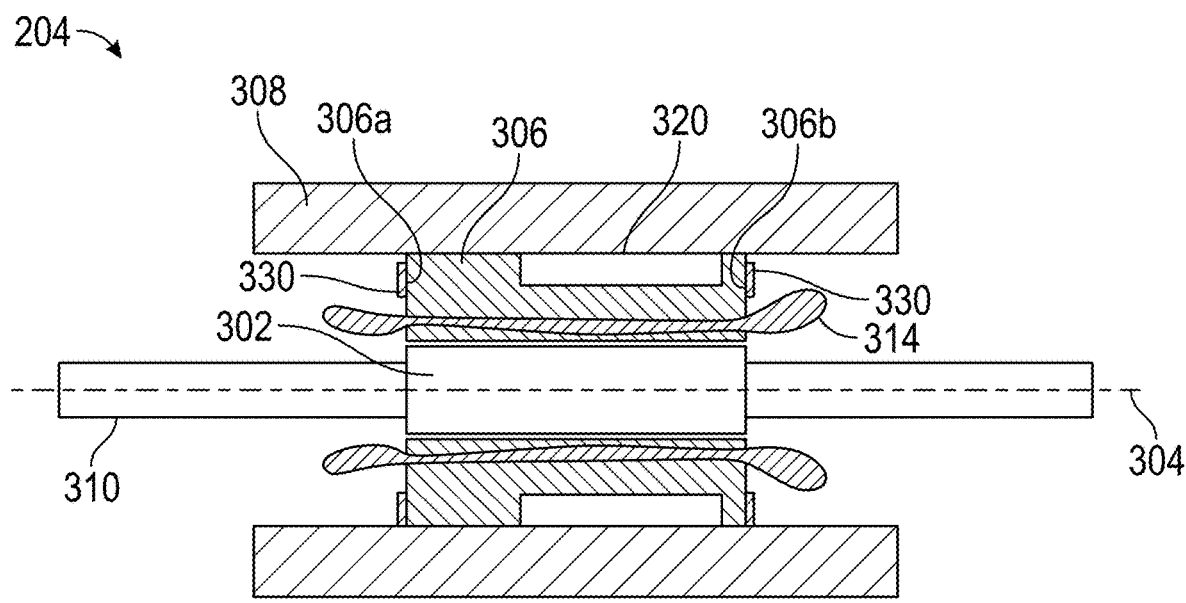
FIG. 4 shows a simplified generator on which the heater disclosed herein is located on ends of the stator.

As illustrated in FIG. 3, a gap 320 is formed between the stator 306 and the housing 308. A self-regulating heater 330 can be disposed in the gap 320 in one embodiment. In an alternative embodiment, the heater 330 can be disposed on an end of the stator 306 as shown in FIG. 4. While heaters are shown on both ends 306a/306b in FIG. 4, only one heater could be provided. Also, a combination of a heater in the gap 320 and on one or both ends 306a/306b is also contemplated.

FIG. 4 shows an example of a heater 330 according to one embodiment. The heater 330 can be used in the locations described above or other locations as needed. The heater includes at least two electrodes.

Figure 5:
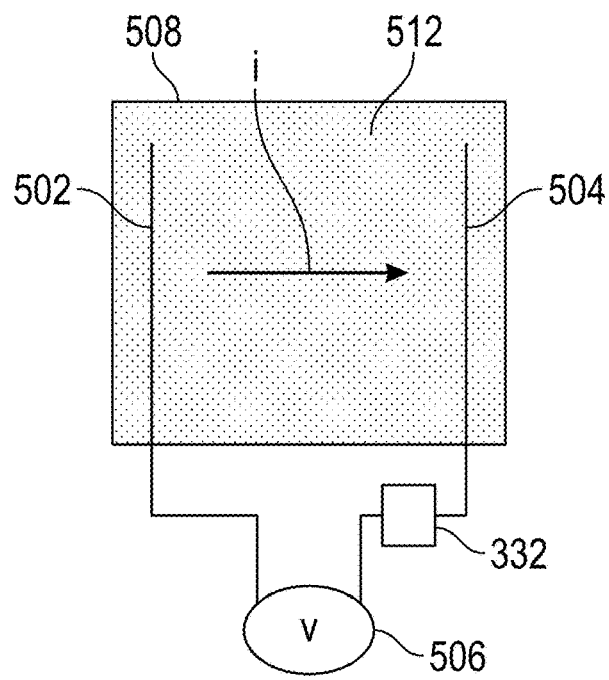
FIG. 5 is a simplified version of a heater according to one embodiment.

As shown in the FIG. 5, there are first and second electrodes 502, 504. The two electrodes are connected either directly or indirectly to a power source such as voltage source 506 and can be formed of any type of conductor (e.g., a metal such as copper or aluminum) The power source 506 creates a potential between the first and second electrodes 502, 504. As shown, the two electrodes a physically separated from one another and do not contact one another.

The first and second electrodes 502, 504 are disposed on or otherwise in a conductive relationship with a conductive matrix layer 508. In one embodiment, the conductive matrix layer 508 is formed as a silicone matrix loaded with conductive carbon particles 512. Such a layer may provide a conductive link between the first and second electrodes 502, 504 so current (i) can pass between them.

Figure 6:
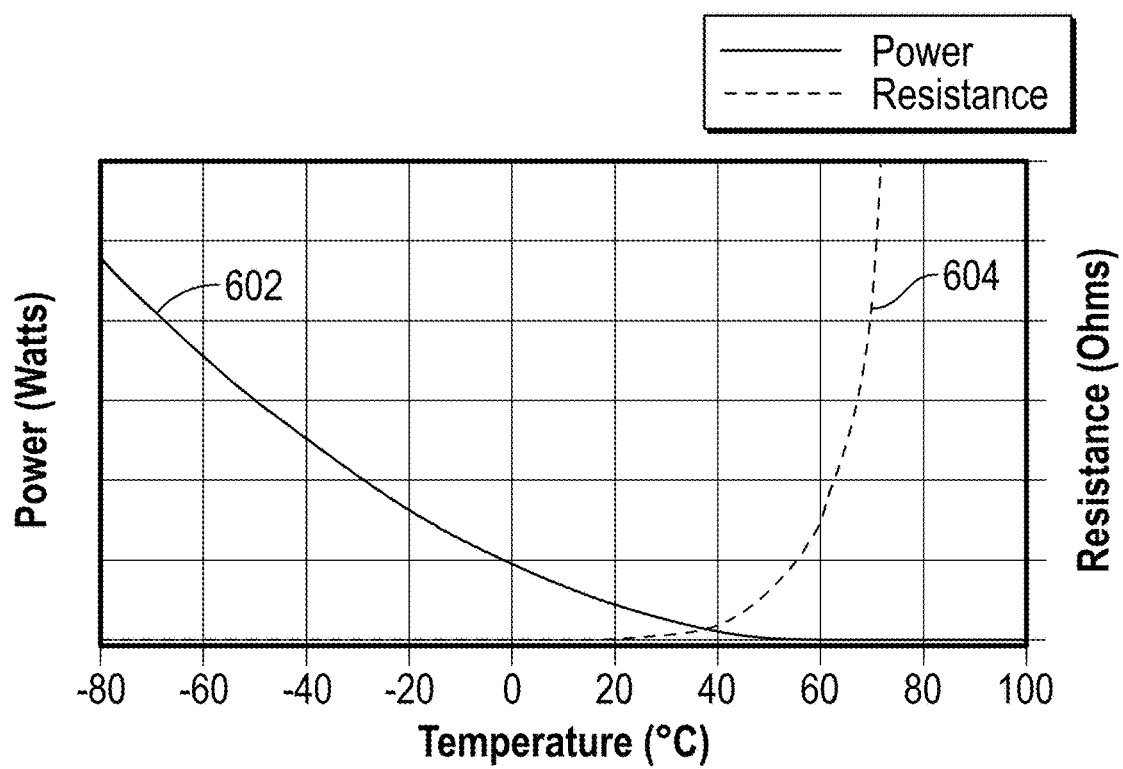
FIG. 6 shows operating parameters of heaters disclosed herein.

FIG. 6 shows the power (e.g. heat) generated by conductive matrix 508 relative to temperature/resistance. In general, as the temperature increases, the resistance (trace 604) of the layer increases. This will reduce the current thought the sheet and, thus, reduce the heat it generates. This reduction is shown by the reduction of power (trace 602) through the layer as temperature increases. In this manner, heat provided by the heater is reduced as the temperature increases. As heat decreases, the current/power decreases.

The heater 330 disclosed herein can be provided as an alternative to the prior art fixed power heater to heat the RAT assembly. The heater 330 operates as above is such that it offers low resistance in cold temperatures to provide required heat and cuts off at temperatures above a threshold. The relative location of the carbon particles in the matrix due to heat serves as the heat sensor. This can, thus, self-sensor the temperature of the heater and when it "senses" its temperature it adjusts. When heat is not needed (e.g., the temperature is above a threshold or cut off temperature power provided to the heater can be effectively cut off (either completely or almost completely) to reduce power waste.

In one embodiment, the heater 330 can include a current limiting element 332 (e.g., a resistor) to adjust the power trace 602 by adding an offset to the resistance trace 604. The circuit can be connected to the leads (e.g., either electrode 502, 504) as shown or in another location. This could allow for the same heater design with different current limits to be used in, for example, different applications while reducing design time.

In any heater embodiment according to present disclosure, a new heater that can have the same or similar form factor as a current heater used for heating a generator (and in particular a RAT) is provided. In can dynamically control power without sensors or controllers, have lower power consumption over life of product, and not experience overheating during hot ambient conditions thereby eliminating structural or overtemperature issues of heater or device where it is located. Indeed, even a portion of the heater is damaged, due to the fluid nature of the particles, the heater will operate as expected.

Figure 7A:
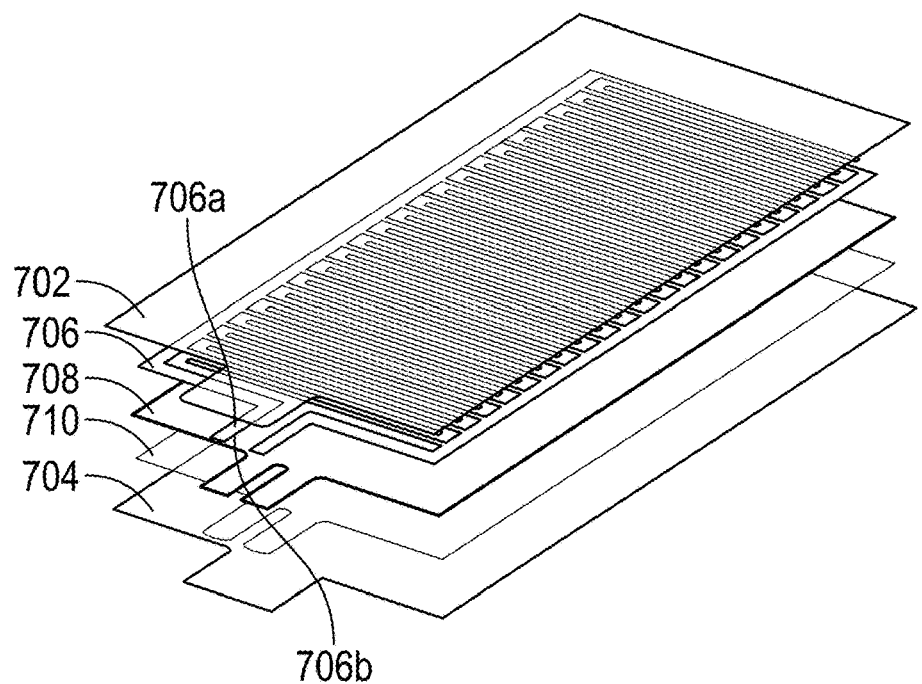
FIGS. 7A and 7B show optional additional portions of a heater according one embodiment.
Figure 7B:
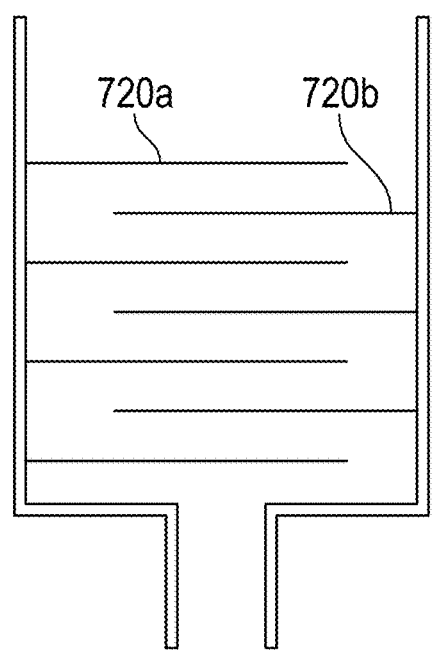

With reference no to FIGS. 7a and 7b, a more complete version of a heater is illustrated. In operates generally as above described. The heater is given reference number 700 but the teachings related to heater 300 also apply as does the chart shown in FIG. 6.

The heater 700 includes upper and lower outer layers 702, 704. These layers can be formed of polyimide/adhesive in one embodiment. The layers surround the carbon silicon matrix 708 and the leads. In this embodiment, the electrodes 706a, 706b are formed from an etched copper layer 706. The electrode 706a includes projections 720a that extend toward electrode 706b. Similarly, the electrode 706b includes projections 720b that extend toward electrode 706a. The projections 720a, 720b do not physically contact each other.

The use of the terms "a," "an," "the," and similar references in the context of description (especially in the context of the following claims) are to be construed to cover both the singular and the plural, unless otherwise indicated herein or specifically contradicted by context. The modifier "about," "substantially," and/or "approximately" used in connection with a quantity is inclusive of the stated value and has the meaning dictated by the context (e.g., it includes the degree of error associated with measurement of the particular quantity). All ranges disclosed herein are inclusive of the endpoints, and the endpoints are independently combinable with each other.

While the invention has been described in detail in connection with only a limited number of embodiments, it should be readily understood that the invention is not limited to such disclosed embodiments. Rather, the invention can be modified to incorporate any number of variations, alterations, substitutions, combinations, sub-combinations, or equivalent arrangements not heretofore described, but which are commensurate with the spirit and scope of the invention. Additionally, while various embodiments of the invention have been described, it is to be understood that aspects of the invention may include only some of the described embodiments.

Accordingly, the present disclosure is not to be seen as limited by the foregoing description but is only limited by the scope of the appended claims.

What is claimed is:

1. A ram air turbine assembly comprising:
   one or more airfoils; and
   a ram turbine operably connected to the one or more airfoils, the ram air turbine comprising:
      a rotor;
      a stator surrounding the rotor and that includes windings; and
      a self-regulating heater disposed on an outer surface of the stator, the self-regulating heater configured to vary power that passes through it based on a temperature of the heater;
   wherein the heater includes:
   first and second electrodes; and
      a silicone matrix that includes conductive particles therein.

2. The assembly of claim 1, wherein the conductive particles are conductive carbon particles.

3. The assembly of claim 1, wherein the electrodes are copper.

4. The assembly of claim 1, further comprising:
   a power source electrically coupled to the first and second electrodes.

5. The assembly of claim 4, further comprising:
   a current limiting element disposed between the power source and the heater that adjusts an offset of the heater to control a threshold.

6. The assembly of claim 1, wherein the first and second electrodes include projections, wherein projections of the first electrode extend toward the second electrode and do not touch the projection of the second electrode.

7. The assembly of claim 1, wherein the heater includes upper and lower outer layers that surround at least portions of the first and second electrodes and the silicon matrix.

8. The assembly of claim 7, wherein the upper and lower outer layers include polyimide.

9. The assembly of claim 1, wherein the heater is disposed on an end of the stator.

10. The assembly of claim 1, wherein the turbine includes a housing and the heater is disposed in a gap formed between the housing and the stator.

* * * * *